United States Patent
Huang-Fu et al.

(10) Patent No.: US 11,246,064 B2
(45) Date of Patent: Feb. 8, 2022

(54) PDN CONNECTION SUPPORTS INTERWORKING TO 5GS

(71) Applicant: MEDIATEK INC., Hsin-Chu (TW)

(72) Inventors: Chien-Chun Huang-Fu, Hsin-Chu (TW); Po Kuang Lu, Hsin-Chu (TW); Chi-Hsien Chen, Hsin-Chu (TW); Shang-Ru Mo, Hsin-Chu (TW); Bo-Hun Chen, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 93 days.

(21) Appl. No.: 16/866,799

(22) Filed: May 5, 2020

(65) Prior Publication Data

US 2020/0359272 A1 Nov. 12, 2020

Related U.S. Application Data

(60) Provisional application No. 62/843,642, filed on May 6, 2019.

(51) Int. Cl.
*H04W 36/00* (2009.01)
*H04W 76/25* (2018.01)
(Continued)

(52) U.S. Cl.
CPC ....... *H04W 36/0033* (2013.01); *H04W 76/25* (2018.02)

(58) Field of Classification Search
CPC . H04W 76/11; H04W 36/0022; H04W 76/20; H04W 36/14; H04W 28/0252; H04W 36/0033; H04W 36/0044; H04W 76/22; H04W 76/25; H04W 8/183; H04W 28/0263; H04W 88/06; H04W 67/148; H04W 36/0066; H04W 92/02
See application file for complete search history.

(56) References Cited

U.S. PATENT DOCUMENTS 10,306,580 B1 * 5/2019 Gupta .................... H04W 8/02
11,026,127 B2 * 6/2021 Huang-Fu ............ H04W 76/32
(Continued)

FOREIGN PATENT DOCUMENTS

CN 101478743 A 1/2008

OTHER PUBLICATIONS

International Search Report and Written Opinion of International Search Authority for PCT/CN2020/088797 dated Jul. 30, 2020 (11 pages).
(Continued)

*Primary Examiner* — Ahmed Elallam
(74) *Attorney, Agent, or Firm* — Imperium Patent Works; Zheng Jin

(57) ABSTRACT

A method of handling a Packet Data Network (PDN) connection to support interworking to 5G system (5GS) is proposed. In a first novel aspect, both UE and the network stores mapped 5GSM parameters of a corresponding Protocol Data Unit (PDU) session when inter-system change from S1 (4G, EPS) mode to A/Gb (2G) mode or Iu (3G, UMTS) mode. In a second novel aspect, the PDN connection is enable to support interworking to 5GS, and the UE is allowed to allocate and indicate the PDU session ID by using the bearer resource modification procedure in EPS, or the mapped 5GSM parameters can be provided and modified in 2G/3G system.

20 Claims, 6 Drawing Sheets

(51) Int. Cl.
  *H04W 76/11*   (2018.01)
  *H04W 76/20*   (2018.01)
  *H04W 76/22*   (2018.01)

(56) References Cited

U.S. PATENT DOCUMENTS

| | | | |
|---|---|---|---|
| 11,039,361 B2* | 6/2021 | Huang-Fu | H04W 76/20 |
| 2013/0155948 A1 | 6/2013 | Pinheiro et al. | 370/328 |
| 2020/0053617 A1* | 2/2020 | Park | H04W 8/02 |
| 2020/0053819 A1* | 2/2020 | Huang-Fu | H04W 8/183 |
| 2020/0107230 A1* | 4/2020 | Zhao | H04W 36/0022 |
| 2020/0267783 A1* | 8/2020 | Huang-Fu | H04W 76/12 |
| 2020/0359254 A1* | 11/2020 | Huang-Fu | H04L 65/1069 |
| 2020/0389830 A1* | 12/2020 | Park | H04W 28/0289 |
| 2021/0289402 A1* | 9/2021 | Ke | H04W 36/0033 |

OTHER PUBLICATIONS

C1-193390 3GPP TSG CT WG1 Meeting #117, MediaTek Inc. "PDN Connection Supports Interworking with 5GS", Reno, NV. USA (2 pages) *chapters 1-2*.

C1-186679 3GPP TSG-CT WG1 Meeting #112bis, Qualcomm Incorporated, "Addition of 5GSM Cause Value in PCO/ePCO (Solution 1)", Vilnius, Lithuania, Oct. 15-19, 2018 (11 pages) *pp. 1-11*.

C1-186248 3GPP TSG-CT WG1 Meeting #112bis, Qualcomm Incorporated, "Addition of 5GSM Cause Value in PCO/ePCO (Solution 1)", Vilnius, Lithuania, Oct. 15-19, 2018 (11 pages)*pp. 1-11*.

* cited by examiner

PDN CONNECTION SUPPORTS INTERWORKING TO 5GS

CROSS REFERENCE TO RELATED APPLICATIONS

This application claims priority under 35 U.S.C. § 119 from U.S. Provisional Application No. 62/843,642, entitled "PDN connection supports interworking to 5GS", filed on May 6, 2019, the subject matter of which is incorporated herein by reference.

TECHNICAL FIELD

The disclosed embodiments relate generally to wireless communication, and, more particularly, to method of establishing and modifying PDN connection that supports interworking to 5G system (5GS).

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The Next Generation Mobile Network (NGMN) board, has decided to focus the future NGMN activities on defining the end-to-end requirements for 5G new radio (NR) systems (5GS).

In 4G evolved packet system (EPS), a Packet Data Network (PDN) connectivity procedure is an important process when LTE communication system accesses to the packet data network. The purpose of PDN connectivity procedure is to setup a default EPS bearer between a UE and the packet data network. In 5G, a Protocol Data Unit (PDU) session establishment a parallel procedure of the PDN connectivity procedure in 4G. A PDU session defines the association between the UE and the data network that provides a PDU connectivity service. Each PDU session is identified by a PDU session ID (PSI), and may include multiple QoS flows and QoS rules. In 5G network, QoS flow is the finest granularity for QoS management to enable more flexible QoS control. The concept of QoS flow in 5G like EPS bearer in 4G. When a QoS flow is added, the network can provide a QoS flow description IE to the UE, which comprises a list of QoS flow descriptions. Each QoS flow description comprises a QoS flow identifier (QFI), a QoS flow operation code, a number of QoS flow parameters, and a QoS flow parameters list. Each parameter included in the parameters list consists of a parameter identifier that identifies the corresponding parameter. One of the parameter identifiers is the EPS bearer identity (EBI), which is used to identify the EPS bearer that is mapped to or associated with the QoS flow.

Interworking to 5GS is supported for a PDN connection if the corresponding default EPS bearer context includes a PDU session identity (PSI), S-NSSAI, session AMBR and one or more QoS flow descriptions received in the Protocol configuration options IE or Extended protocol configuration options IE, or the default EPS bearer context has association with the PDU session identity, the S-NSSAI, the session-AMBR and one or more QoS flow descriptions after inter-system change from N1 (5GS) mode to S1 (4G, EPS) mode. If the UE has a PDN connection which supports interworking to 5GS and then the UE performs inter-system change from S1 mode to A/Gb (2G) or Iu (3G, UMTS) mode, it is not defined whether the mapped 5GSM parameters (e.g., PSI, S-NSSAI, session AMBR, QoS flow descriptions) shall be maintained by both the UE and the network. If the mapped 5GSM parameters are deleted, then after inter-system change from A/Gb mode or Iu mode back to S1 mode, it is impossible for the PDN connection to support interworking to 5GS due to the PSI is only provided in the PDN Connectivity Request message. In addition, it is not defined whether the PDN connection transferred from a PDP context (without mapped 5GSM parameters) shall be enabled to support interworking to 5GS.

SUMMARY

A method of handling a Packet Data Network (PDN) connection to support interworking to 5G system (5GS) proposed. In a first novel aspect, both UE and the network stores mapped 5GSM parameters of a corresponding Protocol Data Unit (PDU) session when inter-system change from S1 (4G, EPS) mode to A/Gb (2G) mode or Iu (3G, UMTS) mode. In a second novel aspect, the PUN connection is enable to support interworking to 5GS, and the UE is allowed to allocate and indicate the PDU session ID by using the bearer resource modification procedure in EPS, or the mapped 5GSM parameters can be provided and modified in 2G/3G system.

In one embodiment, a method of supporting interworking to 5GS for a PDN connection after inter-system change from EPS to 2G/3G is proposed. A UE maintains a Packet data network (PDN) connection in evolved packet system (EPS). The PDN connection comprises an evolved packet system (EPS) bearer. The UE obtains an EPS bearer context for the PDN connection that corresponds to a PDU session in 5GS. The EPS bearer context comprises mapped 5G session management (5GSM) parameters. The UE performs inter-system change from EPS to 3G/2G system. The UE transfers the EPS bearer to a packet data protocol (PDP) context. The UE stores the mapped 5GSM parameters associated with the PDN connection.

In another embodiment, a method of supporting interworking to 5GS for a PDN connection transferred from 2G/3G to EPS is proposed. A UE maintains a packet data protocol (PDP) context in 3G/2G system. The UE transfers the PDP context to an evolved packet system (EPS) bearer of a Packet data network (PDN) connection upon an inter-system change from 3G/2G system to EPS. The UE obtains an EPS bearer context for the PDN connection that corresponds to a PDU session in 5GS. The EPS bearer context comprises mapped 5G session management (5GSM) parameters. The UE performs an inter-system change from EPS to 5GS. The PDN connection is converted to the PDU session.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
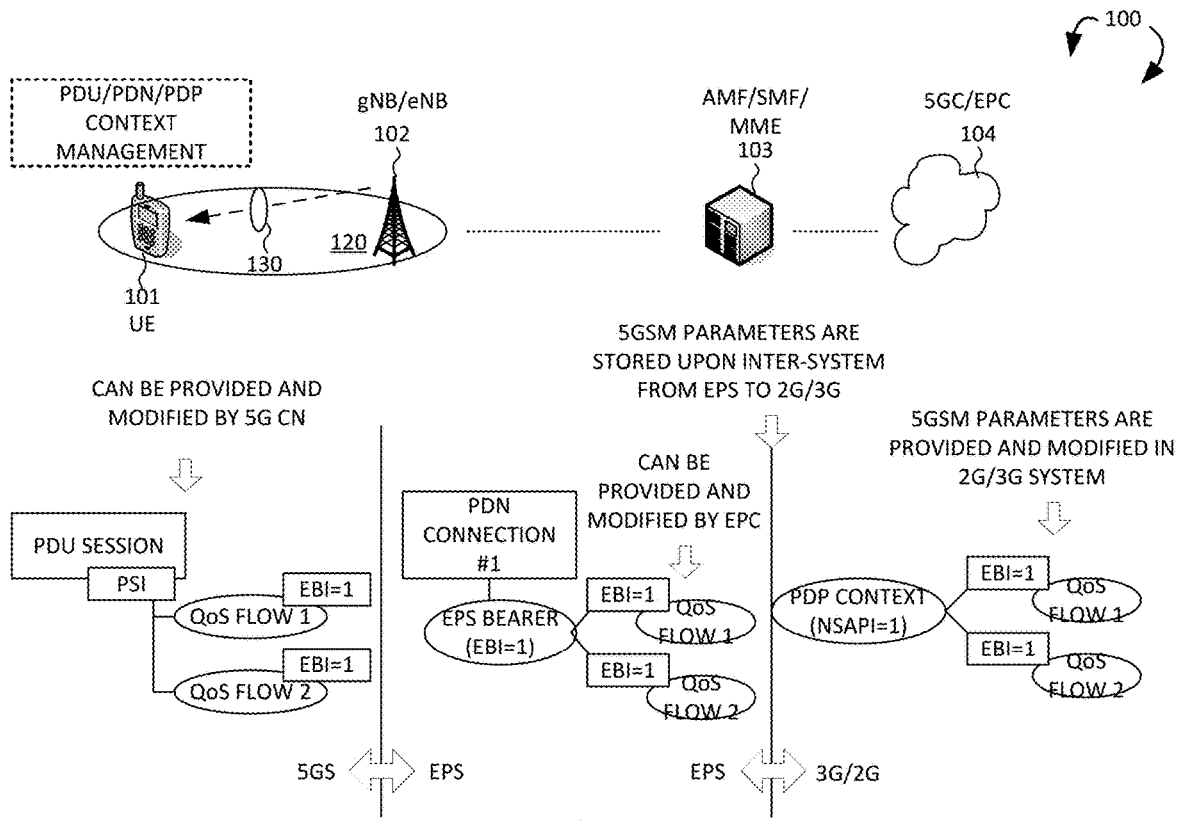
FIG. 1 illustrates an exemplary 5G/4G/3G/2G network and a Packet Data Network (PDN) connection supporting inter-system change to 5GS in accordance with one novel aspect.

FIG. 1 illustrates an exemplary 5G/4G/3G/2G network 100 and a Packet Data Network (PDN) connection supporting inter-system change to 5GS in accordance with one novel aspect. 5G new radio (NR) network 100 comprises a user equipment UE 101, a base station gNB/eNB 102, an access and Mobility Management Function (AMF)/Session Management Function (SMF) 103, and a 5G/4G core network 5GC/EPC 104. In the example of FIG. 1, UE 101 and its serving base station gNB 102 belong to part of a radio access network RAN 120. In Access Stratum (AS) layer, RAN 120 provides radio access for UE 101 via a radio access technology (RAT). In Non-Access Stratum (NAS) layer, AMF/SMF 103 communicates with gNB 102 and 5GC 104 for access and mobility management and PDU session management of wireless access devices in 5G network 100. UE 101 may be equipped with a radio frequency (RF) transceiver or multiple RF transceivers for different application services via different RATs/CNs. UE 101 may be a smart phone, a wearable device, an Internet of Things (IoT) device, and a tablet, etc.

5GS networks are packet-switched (PS) Internet Protocol (IP) networks. This means that the networks deliver all data traffic in IP packets, and provide users with Always-On IP Connectivity. When UE joins a 5GS network, a Packet Data Network (PDN) address (i.e., the one that can used on the PDN) is assigned to the UE for its connection to the PDN. In 4G, a PDN connectivity procedure is to setup a Default EPS Bearer between a UE and the packet data network. EPS has defined the Default EPS Bearer to provide the IP Connectivity that is Always-On. In 5G, a Protocol Data Unit (PDU) session establishment procedure is a parallel procedure of a PDN connectivity procedure in 4G. A PDU session defines the association between the UE and the data network that provides a PDU connectivity service. Each PDU session is identified by a PDU session ID (PSI), and may include multiple QoS flows and QoS rules. In 5G network, QoS flow is the finest granularity for QoS management to enable more flexible QoS control. The concept of QoS flow in 5G is like the EPS bearer context in 4G.

Interworking to 5GS is supported for a PDN connection if the corresponding default EPS bearer context includes a PDU session identity, session aggregate maximum bit rate (AMBR), and one or more QoS flow descriptions received in the Protocol configuration options IE or Extended protocol configuration options IE, or the default EPS bearer context has association with the PDU session identity, the session-AMBR, and one or more QoS flow descriptions after inter-system change from N1 (5GS) mode to S1 (4G, EPS) mode. It is not defined whether the mapped 5GSM parameters (e.g., PSI, session AMBR, QoS flow descriptions) of a PDU session shall be maintained by both the UE and the network upon inter-system change from S1 mode to A/Gb or Iu mode. In addition, it is not defined whether a PDN connection transferred from a PDP context (without mapped 5GSM parameters) shall be enabled to support interworking to 5GS.

Accordingly, a method of handling a PDN connection to support interworking to 5GS is proposed. In a first novel aspect, both UE and the network stores mapped 5GSM parameters of a corresponding PDU session when inter-system change from S1 (4G, EPS) mode to A/Gb (2G) mode or Iu (3G, UMTS) mode. In a second novel aspect, the PDN connection is enabled to support interworking to 5GS, and the UE is allowed to allocate and indicate the PDU session ID by using the bearer resource modification procedure in EPS, or the mapped 5GSM parameters can be provided and modified in 2G/3G system. In a first example of FIG. 1, UE 101 maintains a PDN connection. #1 in EPS. The PDN connection comprises a default EPS bearer having a default EPS bearer context with EBI=1. The default EPS bearer context includes mapped 5GSM parameters (e.g., PSI=1, session AMBR, QoS flow descriptions for QoS flow 1 and QoS flow 2) of a corresponding PDU session that can be provided and modified by EPC. Upon inter-system change from EPS to 2G/3G, both UE 101 and the network stores the mapped 5GSM parameters of the PDU session. As a result, after inter-system change from 2G/3G back to EPS, the PDN connection still supports interworking to 5GS. In a second example of FIG. 1, the PDU connection #1 is transferred from a PDP context with NSAPI=1 in 2G/3G, without mapped 5GSM parameters. UE 101 provides the PSI (PSI=1) by using a bearer resource modification procedure, and the network provides the mapped 5GSM parameters to enable PDN connection #1 to support 5GS interworking. Alternatively, the mapped 5GSM parameters including PSI=1 are provided and modified in 2G/3G system, so that the transferred. PDN connection #1 still supports interworking to 5GS.

Figure 2:
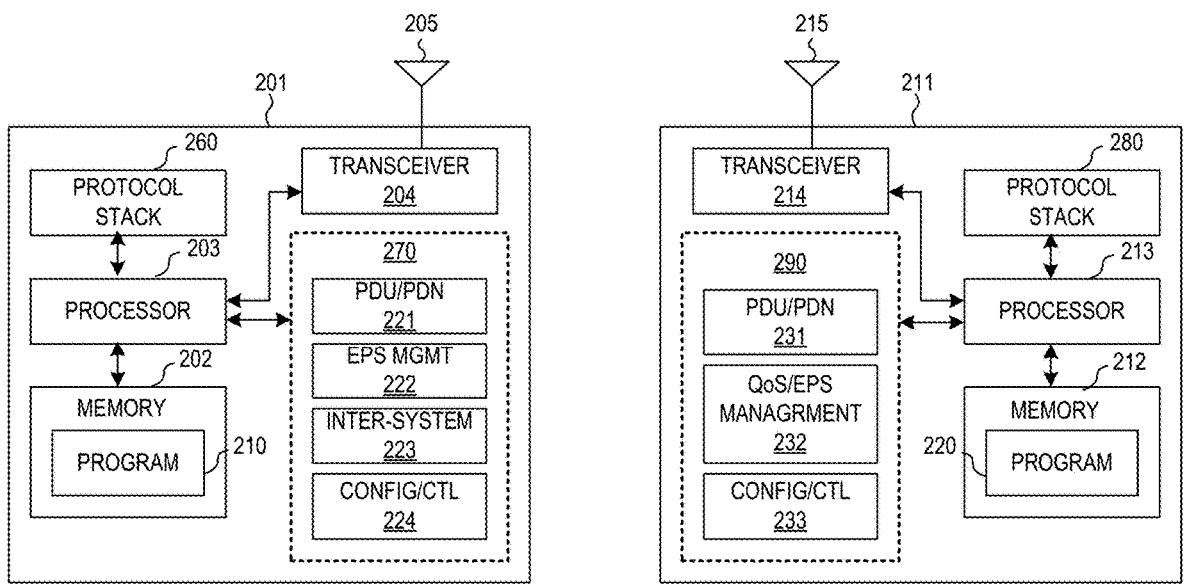
FIG. 2 illustrates simplified block diagrams of a user equipment (UE) and a network entity in accordance with embodiments of the current invention.

FIG. 2 illustrates simplified block diagrams of wireless devices, e.g., a UE 201 and a network entity 211 in accordance with embodiments of the current invention. Network entity 211 may be a base station and/or an AMF/SMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes protocol stack 280 and a set of control functional modules and circuit 290. PDU session and PDN connection handling circuit 231 handles PDU/PDN establishment and modification procedures. QoS and EPS bearer management circuit 232 creates, modifies, and deletes QoS and EPS bearers for UE. Configuration and control circuit 233 provides different parameters to configure and control UE of related functionalities including mobility management and PDU session management.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also comprises a set of functional modules and control circuits to carry out functional tasks of UE 201. Protocol stacks 260 comprise Non-Access-Stratum (NAS) layer to communicate with an AMF/SMF/MME entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network. In one example, system modules and circuits 270 comprise PDU session and PDN connection handling circuit 221 that performs PDU session and PDN connection establishment and modification procedures with the network, an EPS bearer management circuit 222 that manages, creates, modifies, and deletes mapped EPS bearer contexts and mapped 5GSM parameters, an inter-system handling circuit 223 that handles inter-system change functionalities, and a config and control circuit 224 that handles configuration and control parameters for mobility management and session management.

Figure 3:
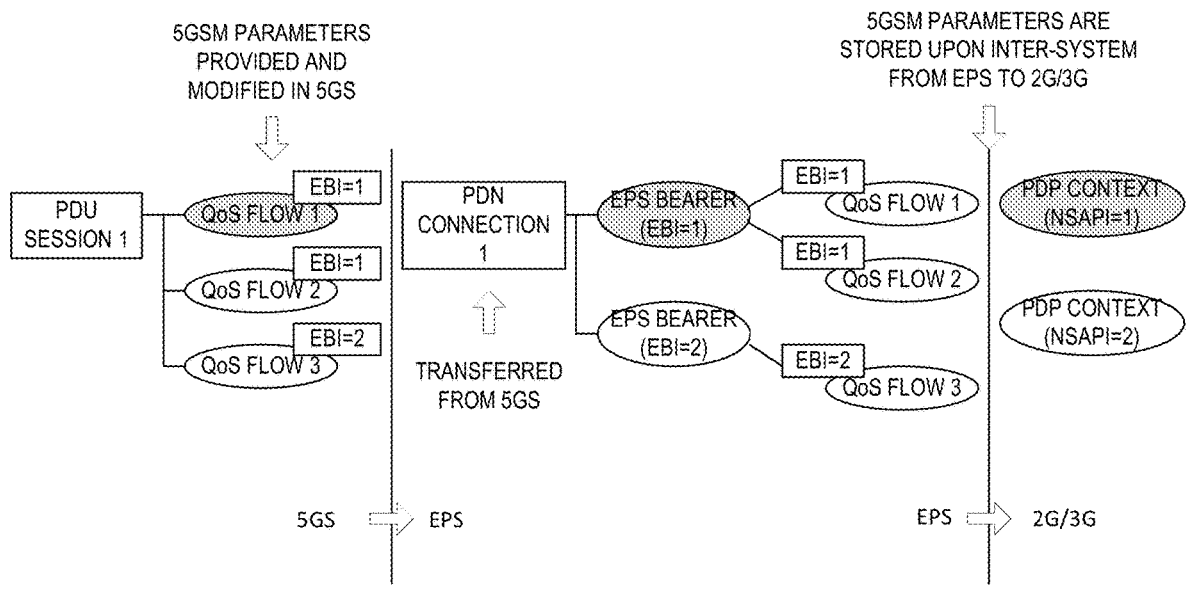
FIG. 3 illustrates a first embodiment of UE storing mapped 5GSM parameters for a PDN connection upon inter-system change from EPS to 2G/3G when the PDN connection is transferred from 5GS.

FIG. 3 illustrates a first embodiment of UE storing mapped 5GSM parameters for a PDN connection upon inter-system change from EPS to 2G/3G when the PDN connection is transferred from 5GS. In the embodiment of FIG. 3, a PDU session 1 (PSI=1) is first established in 5GS. The PDU session comprises three QoS flows. Each QoS flow description comprises a QFI, a QoS flow operation code, a number of QoS flow parameters, and a QoS flow parameters list. Each parameter included in the parameters list consists of a parameter identifier that identifies the parameter. One of the parameter identifiers is the EPS bearer identity (EBI), which is used to identify the EPS bearer that is mapped to or associated with the QoS flow. In this example, QoS flow1 and flow2 are associated to EPS bearer with EBI=1, and QoS flow3 is associated to EPS bearer with EBI=2. When UE performs inter-system change from 5GS to EPS, the PDU session 1 is transferred to a corresponding PDN connection 1. The 5GSM parameters for PDU session 1 are mapped to PDN connection 1. Accordingly, PDN connection 1 has two EPS bearers, EBI=1 is associated to QoS flow 1 and flow2, and EBI=2 is associated to QoS flow 3. In one novel aspect, when UE performs inter-system change from EPS to 2G/3G system, both UE and network stores the mapped 5GSM parameters for PDU session 1. PDN connection 1 is then transferred to PDP contexts with NSAPI=1 and NSAPI=2. In addition, the mapped 5GSM parameters are stored by the UE.

Figure 4:
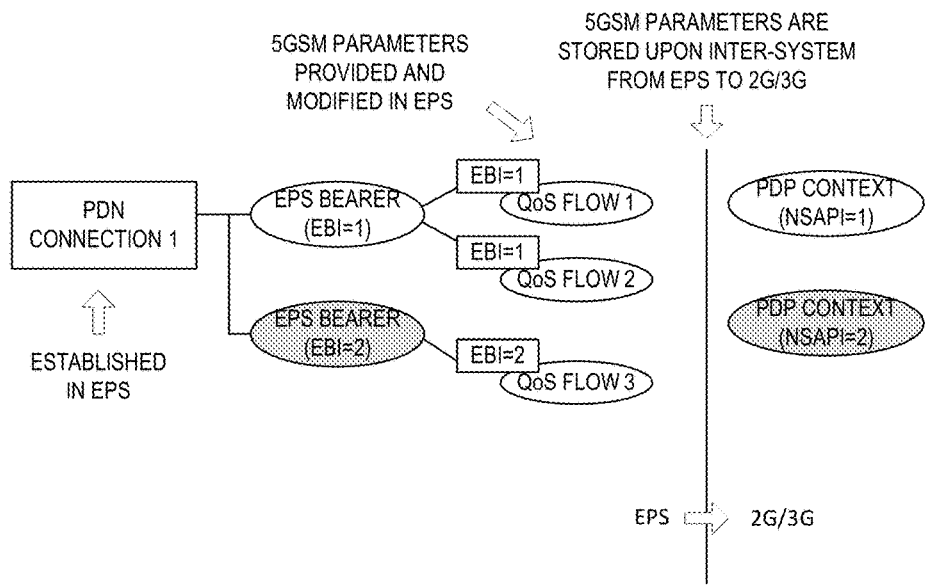
FIG. 4 illustrates a second embodiment of UE storing mapped 5GSM parameters for a PDN connection upon inter-system change from EPS to 2G/3G when the PDN connection is established in EPS.

FIG. 4 illustrates a second embodiment of UE storing mapped 5GSM parameters for a PDN connection upon inter-system change from EPS to 2G/3G when the PDN connection is established in EPS. In the embodiment of FIG. 4, PDN connection 1 is established in EPS. In order to support interworking with 5GS, 5GSM parameters for a corresponding PDU session are provided and modified in EPS, which include PSI, session AMBR, and QoS flow descriptions. For example, PDN connection 1 is mapped to PDU session 1 (PSI=1), and has two EPS bearers. EBI=1 is associated to QoS flow 1 and flow2, and EBI=2 is associated to QoS flow 3. In one novel aspect, when UE performs inter-system change from EPS to 2G/3G system, both UE and network stores the mapped 5GSM parameters for PDU session 1. PDN connection 1 is then transferred to PDP contexts with NSAPI=1 and NSAPI=2. In addition, the mapped 5GSM parameters are stored by the UE.

Figure 5:
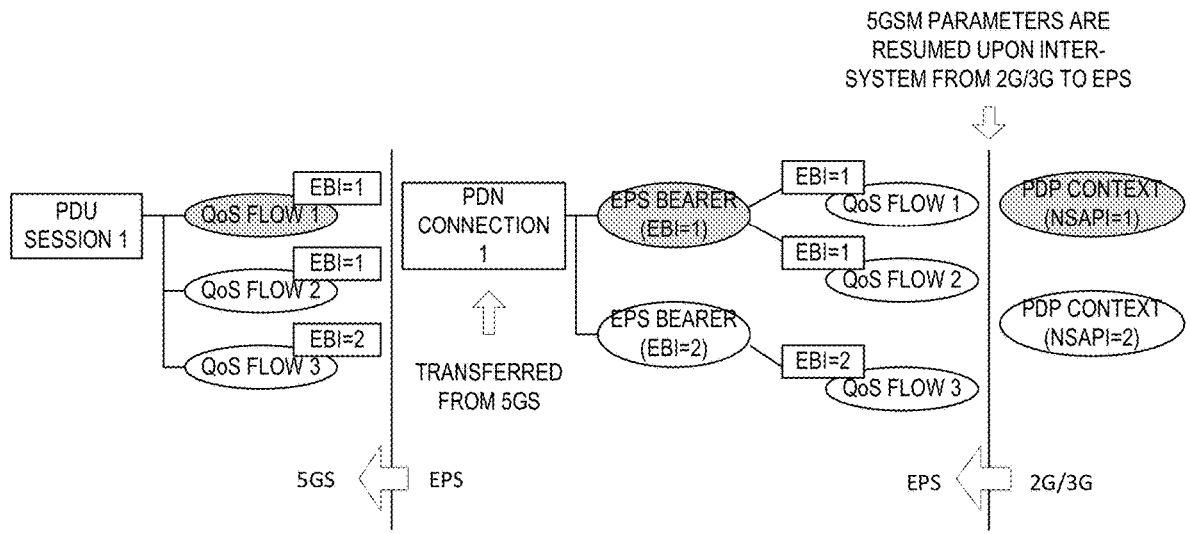
FIG. 5 illustrates one embodiment of resuming mapped 5GSM parameters for a PDN connection after inter-system change from 2G/3G to EPS.

FIG. 5 illustrates one embodiment of resuming mapped 5GSM parameters for a PDN connection after inter-system change from 2G/3G to EPS. As depicted in FIG. 3 and FIG. 4, when UE performs inter-system change from EPS to 2G/3G system, both UE and network stores the mapped 5GSM parameters for PDU session 1. UE also establishes PDP contexts with NSAPI=1 and NSAPI=2. After the UE performs inter-system change from 2G/3G system back to EPS, interworking to 5GS is supported for the corresponding PDN connection 1. The EPS bearers with EBI=1 and EBI=2 are transferred from the PDP context with NSAPI=1 and NSAPI=2, and the mapped 5GSM parameters are resumed for the EPS beares in EPS. As a result, PDN connection 1 still supports interworking to 5GS. In other words, when UE performs inter-system change from EPS to 5GS, PDN connection 1 will be converted to PDU session 1 with PSI=1, and includes the configured QoS flow descriptions and EBI associations.

Figure 6:
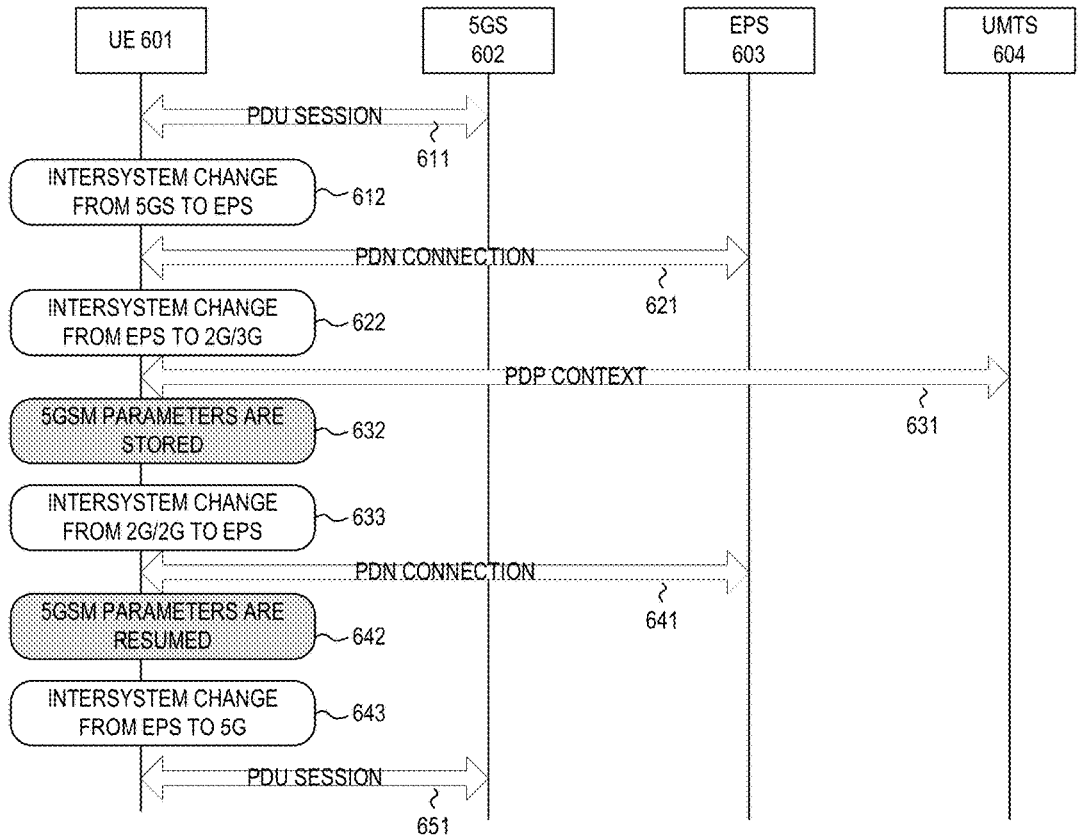
FIG. 6 illustrates a sequence flow between UE and network entity in 5GS/EPS/UMTS for a PDN connection supporting interworking to 5GS after inter-system change from EPS to UMTS and then inter-system change from UMTS to EPS.

FIG. 6 illustrates a sequence flow between UE 601 and network entity in 5GS/EPS/UMTS for a PDN connection supporting interworking to 5GS after inter-system change from EPS to UMTS and then inter-system change from UMTS to EPS. In step 611, a PDU session is established between UE 601 and 5GS 602. The PDU session comprises a PSI and other 5GSM parameters including S-NSSAI, session-AMBR and one or more QoS flow descriptions. In step 612, UE 601 performs inter-system change from 5GS to EPS. The PDU session is mapped to a PDN connection (step 621), which comprises the mapped 5GSM parameters. In step 622, UE 601 performs another inter-system change from EPS to UMTS. The PDN connection is transferred to PDP contexts (step 631), and the mapped 5GSM parameters of the PDU session is stored by UE 601 (step 632). In step 633, UE 601 performs another inter-system change from UMTS system back to EPS. The PDP contexts are transferred to EPS bearers of a PDN connection in EPS (step 641). The mapped 5GSM parameters of the PDU session is resumed for the PDN connection (step 642). In step 643, UE 601 performs another inter-system change from EPS to 5GS. In step 651, the PDN connection is converted back to the PDU session and interworking to 5GS is successful.

Figure 7:
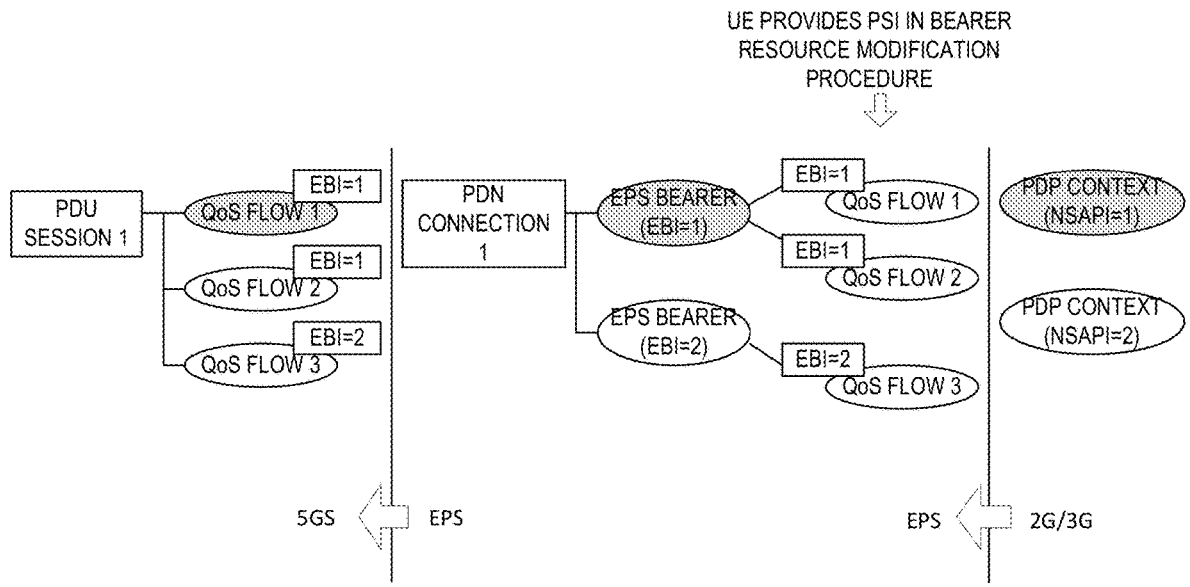
FIG. 7 illustrates a first embodiment of providing mapped 5GSM parameters for PDN connection using bearer resource modification procedure in EPS for supporting interworking to 5GS.

FIG. 7 illustrates a first embodiment of providing mapped 5GSM parameters for PDN connection using bearer resource modification procedure in EPS for supporting interworking to 5GS. In the embodiment of FIG. 7, a PDN connection 1 in EPS is transferred from PDP contexts (with NSAPI=1 and NSAPI=2) in 2G/3G system after inter-system change. Initially, PDN connection 1 does not support interworking to 5GS, since the PDN connection is not provided with a PSI, and has no mapped 5GSM parameters of a corresponding PDU session. In one novel aspect, UE provides PSI=1 of a corresponding PDU session using a bearer resource modification procedure for the PDN connection, then 5GSM parameters of the PDU session with PSI=1 can be provided by the network in EPS. As a result, the PDN connection now supports interworking to 5GS. When inter-system change occurs from EPS to 5GS, the PDN connection 1 can be mapped to PDU session 1 with the PSI and the mapped 5GSM parameters. In this example, PDN connection 1 is mapped to PDU session 1, and has two EPS bearers. EBI=1 is associated to QoS flow 1 and flow2, and EBI=2 is associated to QoS flow 3.

Figure 8:
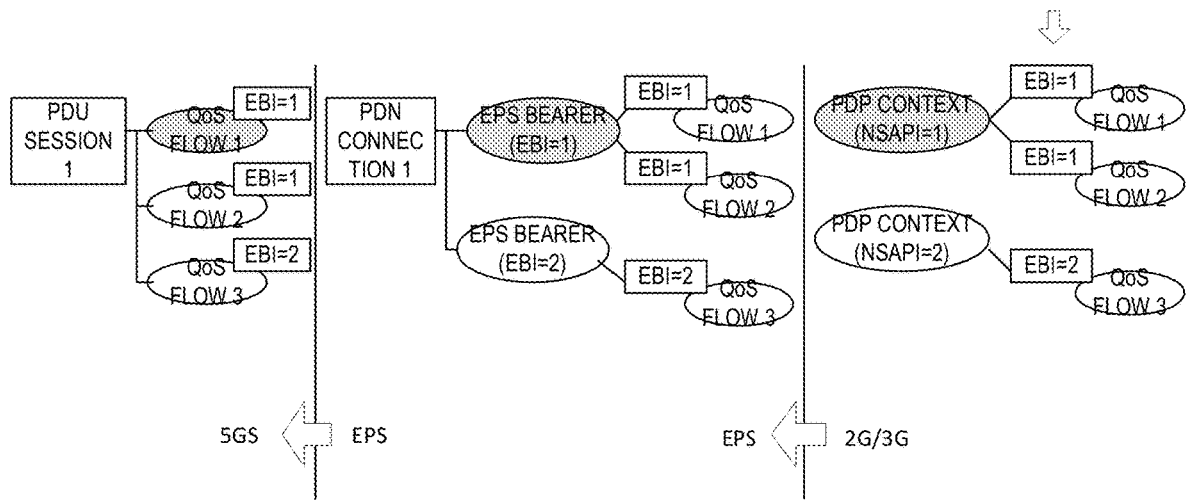
FIG. 8 illustrates a second embodiment of providing mapped 5GSM parameters for PDP context in 2G/3G for supporting interworking to 5GS.

FIG. 8 illustrates a second embodiment of providing mapped 5GSM parameters for PDP context in 2G/3G for supporting interworking to 5GS. In the embodiment of FIG. 8, PDP contexts (with NSAPI=1 and NSAPI=2) are established in 2G/3G system, or transferred from a PDN connection (without storing any 5GSM parameters). When a PDN connection transferred from PDP contexts without 5GSM parameters, this kind of PDN connection will not support interworking to 5GS. In one novel aspect, mapped 5GSM parameters of a corresponding PDU session including PSI can be provided and modified by the network in 2G/3G system. For example, the mapped 5GSM parameters include PSI=1 and two EPS bearers, where EBI=1 associated to QoS flow 1 and QoS flow 2, and EBI=2 associated to QoS flow 3. Later, the EPS bearers of a PDN connection 1 is transferred from the PDP contexts after inter-system change from 2G/3G system to EPS. As a result, PDN connection 1 now supports interworking to 5GS. When inter-system change occurs from EPS to 5GS, PDN connection 1 is mapped to PDU session 1 with the PSI and the mapped 5GSM parameters. In this example, PDN connection 1 is mapped to PDU session 1, and has two EPS bearers. EBI=1 is associated to QoS flow 1 and flow2, and EBI=2 is associated to QoS flow 3.

Figure 9:
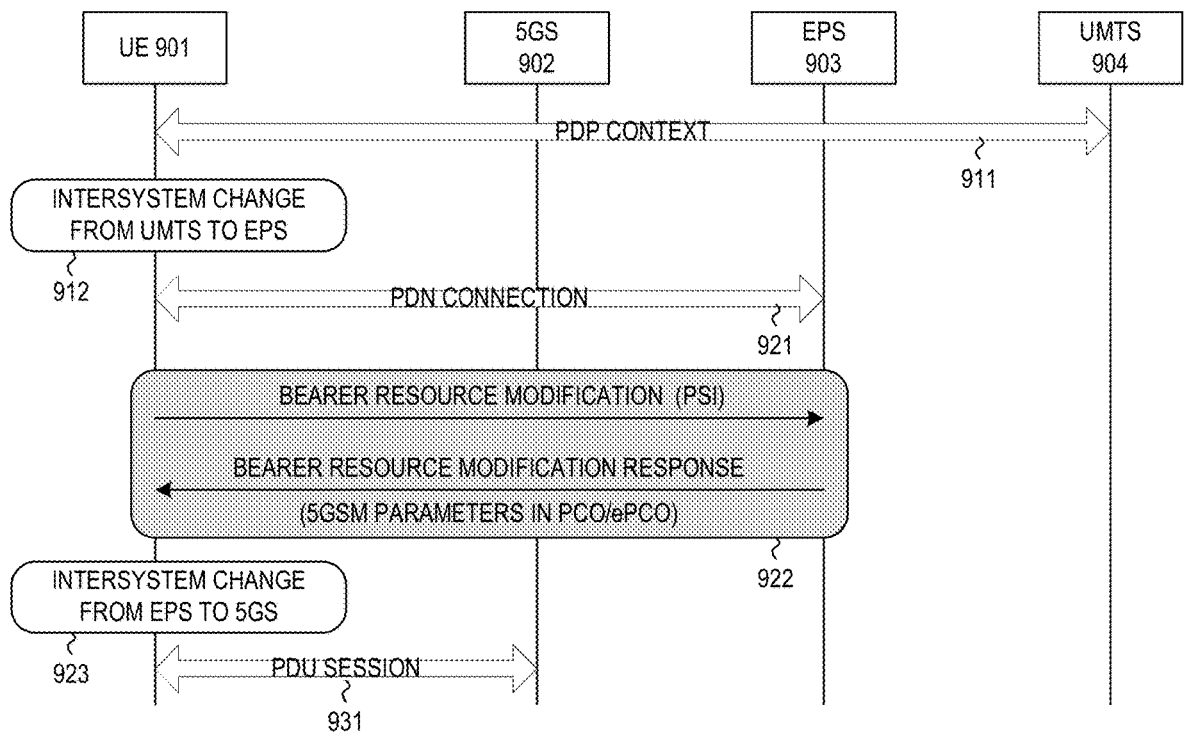
FIG. 9 illustrates a sequence flow between UE and network entity in 5GS/EPS/UMTS for a PDN connection supporting interworking to 5GS after inter-system change from UMTS to EPS, where mapped 5GSM parameters are provided in EPS.

FIG. 9 illustrates a sequence flow between UE 901 and network entity in 5GS/EPS/UMTS for a PDN connection supporting interworking to 5GS after inter-system change from UMTS to EPS, where mapped 5GSM parameters are provided in EPS. In step 911, UE 901 maintains one or more PDP contexts with a network entity in UMTS 904. In step 912, UE 901 performs inter-system change from UMTS to EPS, and the PDP contexts are transferred to one or more EPS bearers of a corresponding PDN connection (step 921). The PDN connection does not support interworking to 5GS because it has no mapped 5GSM parameters. In step 922, UE 901 allocates and indicates a PDU session ID by using a bearer resource modification procedure. For example, UE 901 sends a bearer resource modification request message to the network (provides with PSI). After PSI is allocated, then the network can provide mapped 5GSM parameters of the PDU session to the PDN connection in EPS using a response message of the bearer resource modification message, e.g., modify EPS bearer context request message or activate dedicated EPS bearer context request message (the mapped 5GSM parameters are carried by PCO/ePCO IE). After the modification procedure, the PDN connection supports interworking to 5GS. In step 923, UE 901 performs inter-system change from EPS to 5GS. In step 931, the PDN connection is mapped to the corresponding PDU session based on the 5GSM parameters.

Figure 10:
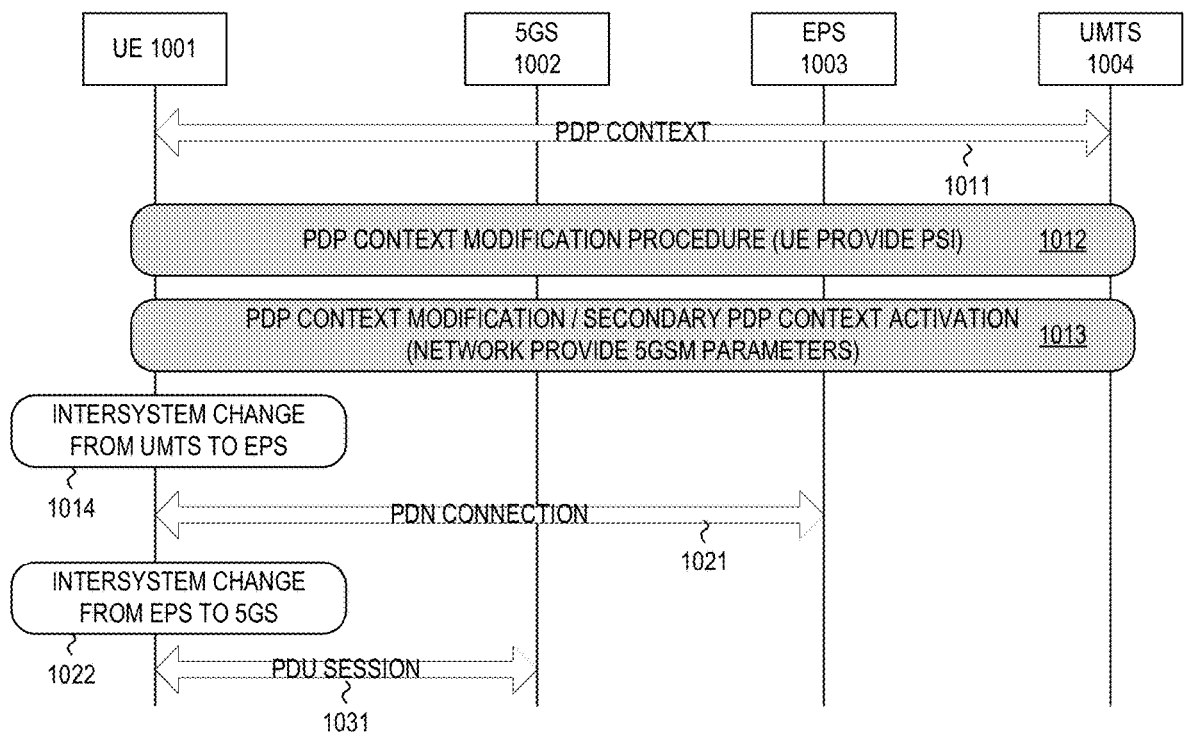
FIG. 10 illustrates a sequence flow between UE and network entity in 5GS/EPS/UMTS for a PDN connection supporting interworking to 5GS after inter-system change from UMTS to EPS, where mapped 5GSM parameters are provided in UMTS.

FIG. 10 illustrates a sequence flow between UE 1001 and network entity in 5GS/EPS/UMTS for a PDN connection supporting interworking to 5GS after inter-system change from UMTS to EPS, where mapped 5GSM parameters are provided in UMTS. In step 1011, UE 1001 maintains one or more PDP contexts with a network entity in UMTS 1004. In step 1012, the UE may allocate and provide the PSI to the network by using PDP context modification procedure or PDP context activation procedure. For example, UE provides the PSI by sending a MODIFY PDP CONTEXT REQUEST message. In step 1013, the 5GSM parameters of a corresponding PDU session are provided and modified by the network in UMTS 1004, using a PDP context modification procedure or secondary PDP context activation procedure. For example, network provides the 5GSM parameters by sending a MODIFY PDP CONTEXT REQUEST message. In step 1014, UE 1001 perform inter-system change from UMTS to EPS. In step 1021, in EPS, the PDP contexts are transferred to one or more EPS bearers of a corresponding PDN connection. The transferred PDN connection supports interworking to 5GS because the mapped 5GSM parameters are transferred and to be associated with the PDU session. In step 1022, UE 1001 performs inter-system change from EPS to 5GS. In step 1031, the PDN connection is mapped to the corresponding PDU session based on the 5GSM parameters.

Figure 11:
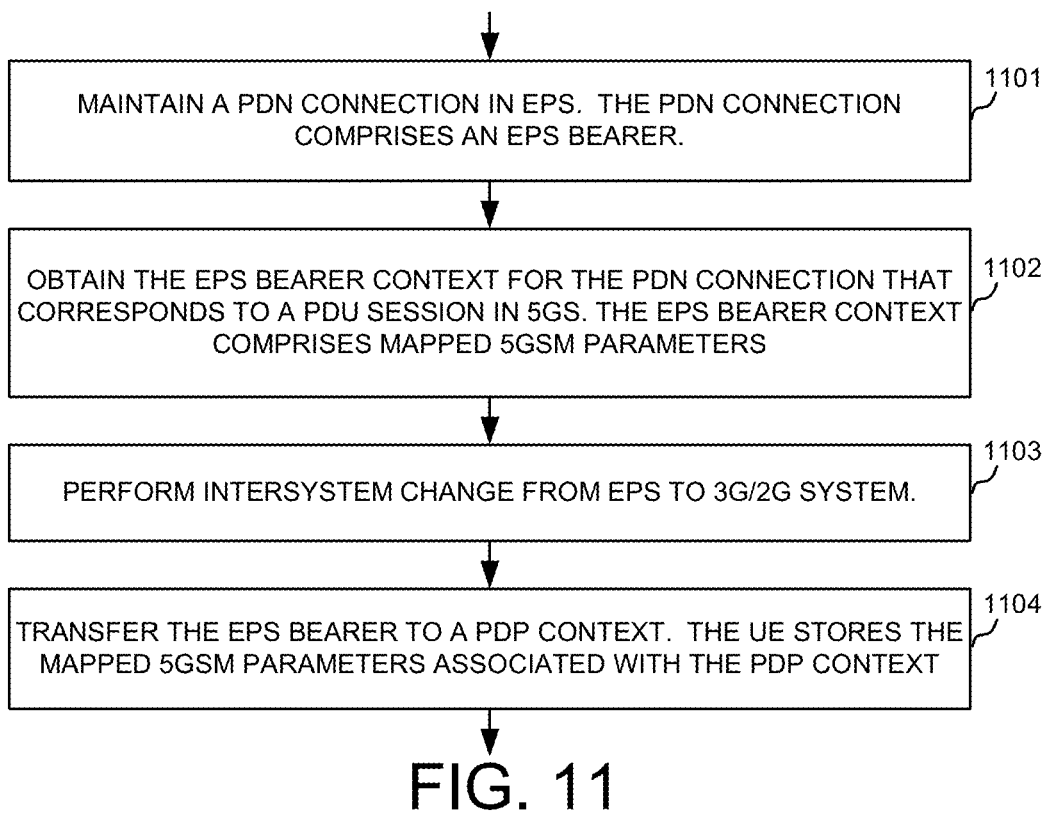
FIG. 11 is a flow chart of a method of supporting interworking to 5GS for a PDN connection after inter-system change from EPS to 2G/3G in accordance with one novel aspect of the present invention.

FIG. 11 is a flow chart of a method of supporting interworking to 5GS for a PDN connection after inter-system change from EPS to 2G/3G in accordance with one novel aspect of the present invention. In step 1101, a UE maintains a Packet data network (PDN) connection in evolved packet system (EPS). The PDN connection comprises an evolved packet system (EPS) bearer. In step 1102, the UE obtains an EPS bearer context for the PDN connection that corresponds to a PDU session in 5GS. The EPS bearer context comprises mapped 5G session management (5GSM) parameters. In step 1103. The UE performs inter-system change from EPS to 3G/2G system. In step 1104, the UE transfers the EPS bearer to a packet data protocol (PDP) context. The UE stores the mapped 5GSM parameters associated with the PDN connection.

Figure 12:
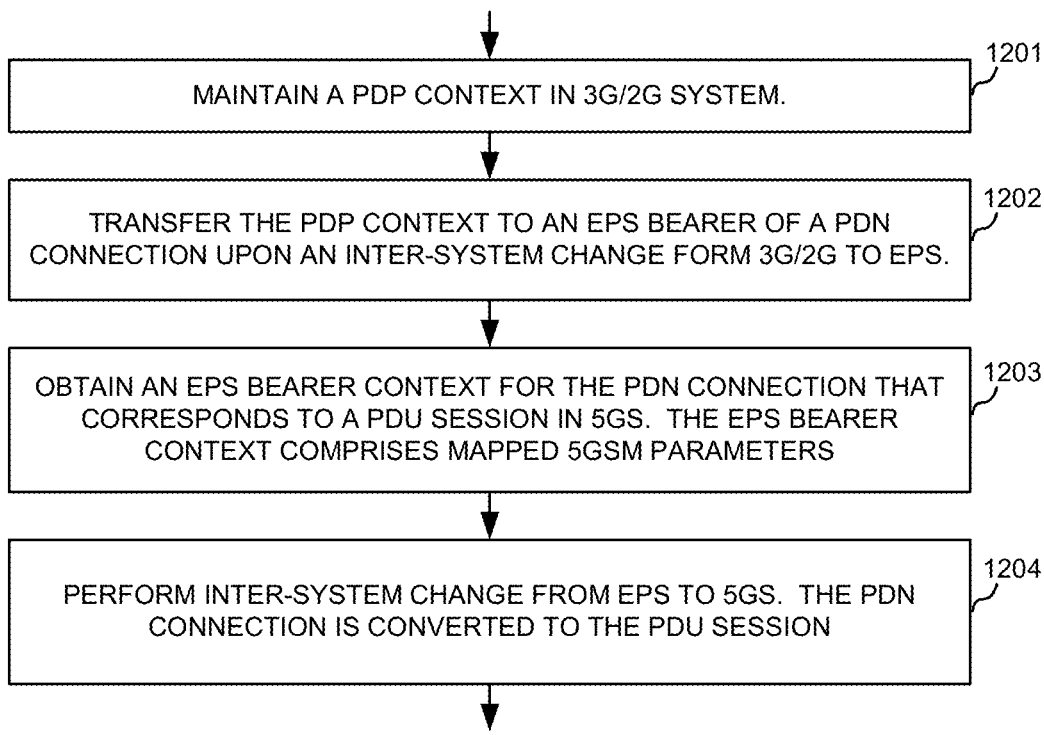
FIG. 12 is a flow chart of a method of supporting interworking to 5GS for a PDN connection transferred from 2G/3G to EPS in accordance with one novel aspect of the present invention.

FIG. 12 is a flow chart of a method of supporting interworking to 5GS for a PDN connection transferred from 2G/3G to EPS in accordance with one novel aspect of the present invention. In step 1201, a UE maintains a packet data protocol (PDP) context in 3G/2G system. In step 1202, the UE transfers the PDP context to an evolved packet system (EPS) bearer of a Packet data network (PDN) connection upon an inter-system change from 3G/2G system to EPS. In step 1203, the UE obtains an EPS bearer context for the PDN connection that corresponds to a PDU session in 5GS. The EPS bearer context comprises mapped 5G session management (5GSM) parameters. In step 1204, the UE performs an inter-system change from EPS to 5GS. The PDN connection is converted to the PDU session.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
maintaining a Packet data network (PDN) connection by a user equipment (UE) in evolved packet system (EPS), wherein the PDN connection comprises an evolved packet system (EPS) bearer;
obtaining an EPS bearer context for the PDN connection that corresponds to a PDU session in 5GS, wherein the EPS bearer context comprises mapped 5G session management (5GSM) parameters;
performing inter-system change from EPS to 3G/2G system; and
transferring the EPS bearer to a packet data protocol (PDP) context, wherein the UE stores the mapped 5GSM parameters associated with the PDN connection.

2. The method of claim 1, wherein the PDN connection is converted from the PDU session, wherein the mapped 5GSM parameters are obtained for the EPS bearer context when the UE performs inter-system change from 5GS to EPS.

3. The method of claim 1, wherein the PDN connection is established in EPS, and wherein the mapped 5GSM parameters are provided in EPS using a bearer resource modification procedure, a dedicated EPS bearer context activation procedure, or a PDN connectivity procedure.

4. The method of claim 3, wherein the UE provides the PDU session identity of the PDU session using a bearer resource modification procedure or a PDN connectivity procedure.

5. The method of claim 1, wherein the PDP context is transferred back to the EPS bearer of the PDN connection in EPS, and wherein the PDN connection resumes the mapped 5GSM parameters.

6. A User Equipment (UE), comprising:
a Packet data network (PDN) connectivity handling circuit that maintains a PDN connection in evolved packet system (EPS), wherein the PDN connection comprises an evolved packet system (EPS) bearer;
an EPS bearer management circuit that obtains an EPS bearer context for the PDN connection that corresponds to a PDU session in 5GS, wherein the EPS bearer context comprises mapped 5G session management (5GSM) parameters; and
an inter-system handling circuit that performs inter-system change from EPS to 3G/2G system, wherein the UE transfers the EPS bearer to a packet data protocol (PDP) context, and wherein the UE stores the mapped 5GSM parameters associated with the PDN connection.

7. The UE of claim 6, wherein the PDN connection is converted from the PDU session, wherein the mapped 5GSM parameters are obtained for the EPS bearer context when the UE performs inter-system change from 5GS to EPS.

8. The UE of claim 6, wherein the PDN connection is established in EPS, and wherein the mapped 5GSM parameters are provided in EPS using a bearer resource modification procedure, a dedicated EPS bearer context activation procedure, or a PDN connectivity procedure.

9. The UE of claim 8, wherein the UE provides the PDU session identity of the PDU session using a bearer resource modification request, or a PDN connectivity procedure.

10. The UE of claim 6, wherein the PDP context is transferred back to the EPS bearer of the PDN connection in EPS, and wherein the PDN connection resumes the stored mapped 5GSM parameters.

11. A method comprising:
maintaining a packet data protocol (PDP) context by a user equipment (UE) in 3G/2G system;
transferring the PDP context to an evolved packet system (EPS) bearer of a Packet data network (PDN) connection upon an inter-system change from 3G/2G system to EPS;
obtaining an EPS bearer context for the PDN connection that corresponds to a PDU session in 5GS, wherein the EPS bearer context comprises mapped 5G session management (5GSM) parameters; and
performing an inter-system change from EPS to 5GS, wherein the PDN connection is converted to the PDU session.

12. The method of claim 11, wherein the UE provides the PDU session identity to the PDN connection using a bearer resource modification procedure in EPS.

13. The method of claim 12, wherein the mapped 5GSM parameters associated with the PDU session are provided and modified via a bearer resource modification procedure or a dedicated EPS bearer context activation procedure in EPS.

14. The method of claim 11, wherein the mapped 5GSM parameters associated with the PDU session are provided and modified in 3G/2G system.

15. The method of 14, wherein the UE obtains the mapped 5GSM parameters for the EPS bearer upon the inter-system change from 3G/2G system to EPS.

16. A User Equipment (UE) comprising:
a Packet data network (PDN) connectivity handling circuit that maintains a packet data protocol (PDP) context to an evolved packet system (EPS) bearer of a Packet data network (PDN) connection upon an inter-system change from 3G/2G system to EPS;
an EPS bearer management circuit that obtains an EPS bearer context for the PDN connection that corresponds to a PDU session in 5GS, wherein the EPS bearer context comprises mapped 5G session management (5GSM) parameters; and an inter-system handling circuit that performs inter-system change from EPS to 5GS, wherein the PDN connection is converted to the PDU session.

17. The UE of claim 16, wherein the UE provides the PDU session identity to the PDN connection using a bearer resource modification procedure in EPS.

18. The UE of claim 17, wherein the mapped 5GSM parameters associated with the PDU session are provided and modified via a bearer resource modification procedure or a dedicated EPS bearer context activation procedure in EPS.

19. The UE of claim 16, wherein the mapped 5GSM parameters associated with the PDU session are provided and modified in 3G/2G system.

20. The UE of claim 19, wherein the UE obtains the mapped 5GSM parameters for the EPS bearer upon the inter-system change from 3G/2G system to EPS.

* * * * *